United States Patent
Tsai et al.

(10) Patent No.: US 8,333,125 B2
(45) Date of Patent: Dec. 18, 2012

(54) ENVIRONMENTALLY FRIENDLY, ENERGY-ECONOMIC SYSTEM FOR TESTING FUEL CELL STACKS

(75) Inventors: Yu-Ching Tsai, Taoyuan County (TW); Wen-Tang Hong, Taoyuan County (TW); Hung-Yu Wang, Taoyuan County (TW); Wei-Ping Huang, Taoyuan County (TW); Ruey-Yi Lee, Taoyuan County (TW)

(73) Assignee: Atomic Energy Council—Institute of Nuclear Energy Research, Lungtan, Taoyuan (TW)

( * ) Notice: Subject to any disclaimer, the term of this patent is extended or adjusted under 35 U.S.C. 154(b) by 576 days.

(21) Appl. No.: 12/689,739

(22) Filed: Jan. 19, 2010

(65) Prior Publication Data

US 2011/0177408 A1   Jul. 21, 2011

(51) Int. Cl.
*G01R 31/40* (2006.01)
*H01M 8/04* (2006.01)
*H01M 8/02* (2006.01)
*G01N 27/416* (2006.01)
*H01M 8/12* (2006.01)

(52) U.S. Cl. ......... 73/865.9; 429/90; 429/414; 429/423; 429/427; 429/430; 429/435; 429/436; 429/439; 429/441; 429/444; 429/446; 429/515; 702/121

(58) Field of Classification Search ................. 73/865.9; 429/90, 414, 423, 427, 430, 435–436, 439, 429/441, 444, 446, 515, FOR. 111, FOR. 120–FOR. 124; 702/81, 121, 182–183

See application file for complete search history.

(56) References Cited

U.S. PATENT DOCUMENTS

| | | | | |
|---|---|---|---|---|
| 5,991,670 A * | 11/1999 | Mufford et al. | ................. | 701/22 |
| 6,387,556 B1 * | 5/2002 | Fuglevand et al. | ............ | 429/429 |
| 6,495,277 B1 * | 12/2002 | Edlund et al. | ............. | 429/430 X |
| 6,730,271 B2 * | 5/2004 | Hirata | ............................ | 422/110 |
| 8,244,382 B2 * | 8/2012 | Wang et al. | ..................... | 700/17 |
| 2002/0031458 A1 * | 3/2002 | Hirata | ............................ | 422/189 |
| 2004/0110047 A1 * | 6/2004 | Hwang et al. | .................. | 429/22 |
| 2005/0129995 A1 * | 6/2005 | Kato et al. | ....................... | 429/17 |
| 2008/0314747 A1 * | 12/2008 | Tezuka et al. | ................. | 204/431 |

FOREIGN PATENT DOCUMENTS

TW   201017353 A  *  5/2010

* cited by examiner

*Primary Examiner* — Thomas P Noland
(74) *Attorney, Agent, or Firm* — Jackson IPG PLLC

(57) ABSTRACT

Disclosed is a system with which fuel cell stacks can be tested automatically or manually so that production of pollutants and consumption of electricity are little. The system runs various analyses and tests on the fuel cell stacks and provides operative conditions such as temperatures and fluid flows needed in the tests.

20 Claims, 5 Drawing Sheets

ENVIRONMENTALLY FRIENDLY, ENERGY-ECONOMIC SYSTEM FOR TESTING FUEL CELL STACKS

FIELD OF THE INVENTION

The present invention relates to an environmentally friendly, energy-economic system for testing fuel cell stacks and, more particularly, to an environmentally friendly, energy-economic system for running various analyses and tests on fuel cell stacks and providing operative conditions such as temperatures and fluid flows needed in the tests so that consumption of electricity and production of pollutants are reduced.

DESCRIPTION OF THE RELATED ARTS

Fuel cells are getting a lot of attention for being environmentally friendly and efficient regarding energy conversion. There are proton exchange membrane fuel cells ("PEMFC"), alkaline fuel cells ("AFC"), phosphoric acid fuel cells ("PAFC"), molten carbonate fuel cells ("MCFC") and solid oxide fuel cells ("SOFC"). PEMFC, AFC and PAFC are classified in a low-temperature type. MCFC are classified in a intermediate-temperature type. SOFC are classified in a high-temperature type. Moreover, there are direct methanol fuel cell ("DMFC") and metal-air hybrid cells. SOFC are getting more attention than other fuel cells for their high energy efficiencies, high-temperature waste heat and ability to use a variety of kinds of fuels.

Regarding operative principles of an SOFC, a fuel and an oxidizer such as air and oxygen are preheated to a temperature near an operative temperature (600 to 1000 degrees Celsius) of stacks of the SOFC before they are introduced into the anode and cathode of the SOFC respectively. Hydrogen is often used as the fuel. Alternatively, a hydrocarbon fuel such as natural gas may also be used as the fuel. In this case, a reformer can be used to convert the hydrocarbon into a hydrogen-rich gas for use in the SOFC.

Unlike the fuel cells of the low-temperature type, SOFC require a high operative temperature of 600 to 1000 degrees Celsius. Moreover, an SOFC includes a membrane electrolyte assembly ("MEA"). At the cathode of the MEA, oxygen ions are formed. Then, the oxygen ions are transferred to the anode side of the MEA through a solid-state electrolyte. At the anode of the MEA, the oxygen ions react with hydrogen, carbon monoxide or a hydrocarbon fuel fuel. The products of the reaction are electrons, water and heat. Because the operative temperature of an SOFC is high, the temperature of the products near the anode and the temperature of the products near the cathode are close to the operative temperature of the stack. Therefore, the heat of the product gas can be recuperated for the pre-heating of the fresh reactants of the stack inlet.

In the operation of the low-temperature type of fuel cells or the high-temperature type of fuel cells, not all of the fuels in the stack are used. Typically, about 60% to 85% of the fuels in the stack are used. That is, about 15% to 40% of the fuel is not consumed during the electrochemical reaction. A burner is often used to burn the residual fuel to release heat that can be recovered with a heat exchanger and used for preheating the fresh reactants.

During development of SOFC, varieties of tests on the stacks are necessary. Generally, a test station is used to test the stacks. An example of a test station for the low-temperature type of fuel cells can be found in Taiwanese Patent M572462. The exemplary test station includes a gas supply unit, a stack load control unit, a system control unit and a human-machine interface. However, other test stations for the low-temperature type of fuel cells were seen before the filing of the Taiwanese patent and these test stations cannot be used for the high-temperature type of fuel cells.

The present invention is therefore intended to obviate or at least alleviate the problems encountered in prior art.

SUMMARY OF THE INVENTION

It is an objective of the present invention to provide a system with which fuel cell stacks can be tested automatically or manually.

It is another objective of the present invention to provide an environmental friendly, energy-economic system for running various analyses and tests on fuel cell stacks and providing operative conditions such as temperatures and fluid flows needed in the tests.

To achieve the foregoing objectives, the system includes a system control unit, a temperature control unit, a fluid supply unit, a heat recovery unit, a gas-preheating and reforming unit, a furnace and compressive load unit, an electrical load and performance measurement unit, a gas/pressure analysis unit, a gas-cooling and vapor-condensing unit, a security unit and a human-machine interface. The system control unit includes a controller, a signal acquisition device, an industrial computer and a signal-and-power line. The temperature control unit is connected to the system control unit, and includes a temperature sensor and a temperature controller. The fluid supply unit provides fluid that includes a fuel, an oxidizer and water. The fluid supply unit is connected to the system control unit, and includes mass flow controllers, a gas humidifier and a set of piping. The heat recovery unit is connected to the system control unit, the fluid supply unit and the fuel cell, and includes a rear-part heat exchanger for recovering heat of hot gas released from the fuel cell. The gas-preheating and reforming unit is connected to the fuel cell, and includes a heater and a reformer. The heater executes a second phase of heating the fluid provided from the fluid supply unit. The reformer reforms the fuel to hydrogen-rich gas. The furnace and compressive load unit is connected to the temperature control unit, and includes a furnace and a compressive load element. The furnace heats up the fuel cell under the control of the temperature controller. The compressive load element exerts a compressive load on the fuel cell. An electrical load and performance measurement unit is connected to the system control unit and the fuel cell, and includes an electrical load instrument and an AC impedance analyzer. The AC impedance analyzer measures the internal impedance of the fuel cell. The gas/pressure analysis unit is connected to the system control unit, the fluid supply unit, the heat recovery unit, the preheating and reforming unit and the fuel cell, and includes a gas analyzer and an absolute/differential pressure sensor. The gas analyzer analyzes gases released from the reformer, the burner and the fuel cell to evaluate performance of the units. Sampling of the gases is executed under the control of the system control unit. The absolute/differential pressure sensor monitors pressure in a middle segment of the system. The gas-cooling and vapor-condensing unit is connected to the fluid supply unit and the gas/pressure analysis unit, and includes a gas-cooling and vapor-condensing module and a condensed water filter and storage tank. The gas-cooling and vapor-condensing module cools the hot gas in a rear segment of the system. The condensed water filter and storage tank filters and collects the water for use in the fluid supply unit. The security unit monitors security in the system and triggers a security procedure in the system control unit. The security unit is connected to the system control unit, and includes a programmable logic controller operable independent of the system control unit, a hazardous gas sensor and an uninterrupted power supply. The human-machine interface is connected to the system control unit, and includes a display and a command output device. The display shows numbers, charts and tables of data processed in the industrial computer. The command output device is operable for giving commands to the system control unit. The controller of the system control unit is used as a control center for the temperature control unit, the fluid supply unit, the heat recovery unit, the load control and performance measurement unit, the gas/pressure analysis unit, the security unit and the human-machine interface.

Other objectives, advantages and features of the present invention will become apparent from the following description referring to the attached drawings.

BRIEF DESCRIPTIONS OF THE DRAWINGS

The present invention will be described via the detailed illustration of two embodiments referring to the drawings.

DESCRIPTION OF THE PREFERRED EMBODIMENT

Figure 1:
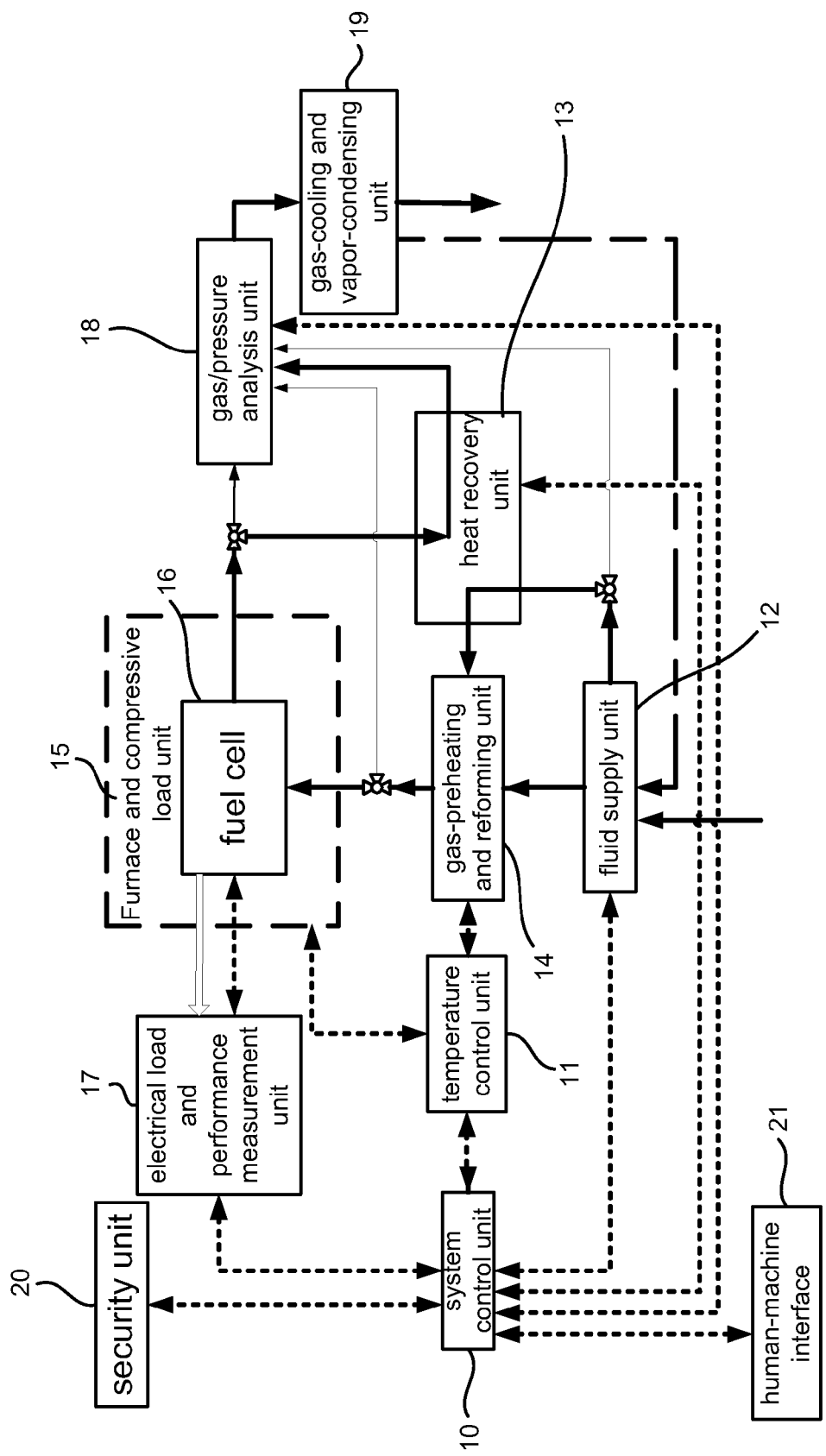
FIG. 1 is a block diagram of a system for testing fuel cells according to the first embodiment of the present invention.

Referring to FIG. 1, a solid oxide fuel cell ("SOFC") 16 is tested with an environmentally friendly, energy-economic system according to a first embodiment of the present invention. The system includes a system control unit 10, a temperature control unit 11, a fluid supply unit 12, a heat recovery unit 13, a preheating and reforming unit 14, a furnace and compressive load unit 15, an electrical load and performance measurement unit 17, a gas/pressure analysis unit 18, a gas-cooling and vapor-condensing unit 19, a security unit 20 and a human-machine interface 21. In operation of the system, consumption of energy and production of pollutants are minimized.

The system control unit 10 includes a controller, a signal acquisition device, an industrial computer and a signal-and-power line. The controller may be a programmable logic controller ("PLC") or a controller including a microprocessor. The system control unit 10 controls all statuses of the system. The controller of the system control unit 10 is used as a control center for the temperature control unit 11, the fluid supply unit 12, the heat recovery unit 13, the electrical load and performance measurement unit 17, the gas/pressure analysis unit 18, the security unit 20 and the human-machine interface 21.

The temperature control unit 11 is connected to the system control unit 10. The temperature control unit 11 includes a temperature sensor and a temperature controller. The temperature sensor may be a thermocouple. The temperature controller controls the output power of the preheating and reforming unit 14 and the furnace and compressive load unit 15 to achieve temperature increasing rates and target temperatures required for tests. The temperature controller may be a PID controller.

The fluid supply 12 is connected to the system control unit 10. The fluid supply 12 includes mass flow controllers 121, a gas humidifier 122 and a piping 123. The fluid supply 12 supplies fluid that includes a fuel, an oxidizer and water. The fuel and oxidizer may be in the form of gas or liquid.

The heat recovery unit 13 is optional, i.e., the system is workable with or without the heat recovery unit 13. The heat recovery unit 13 is connected to the system control unit 10 and the fluid supply unit 12. The heat recovery unit 13 is used for a first phase of heating the fluid provided from the fluid supply unit 12.

Figure 2:
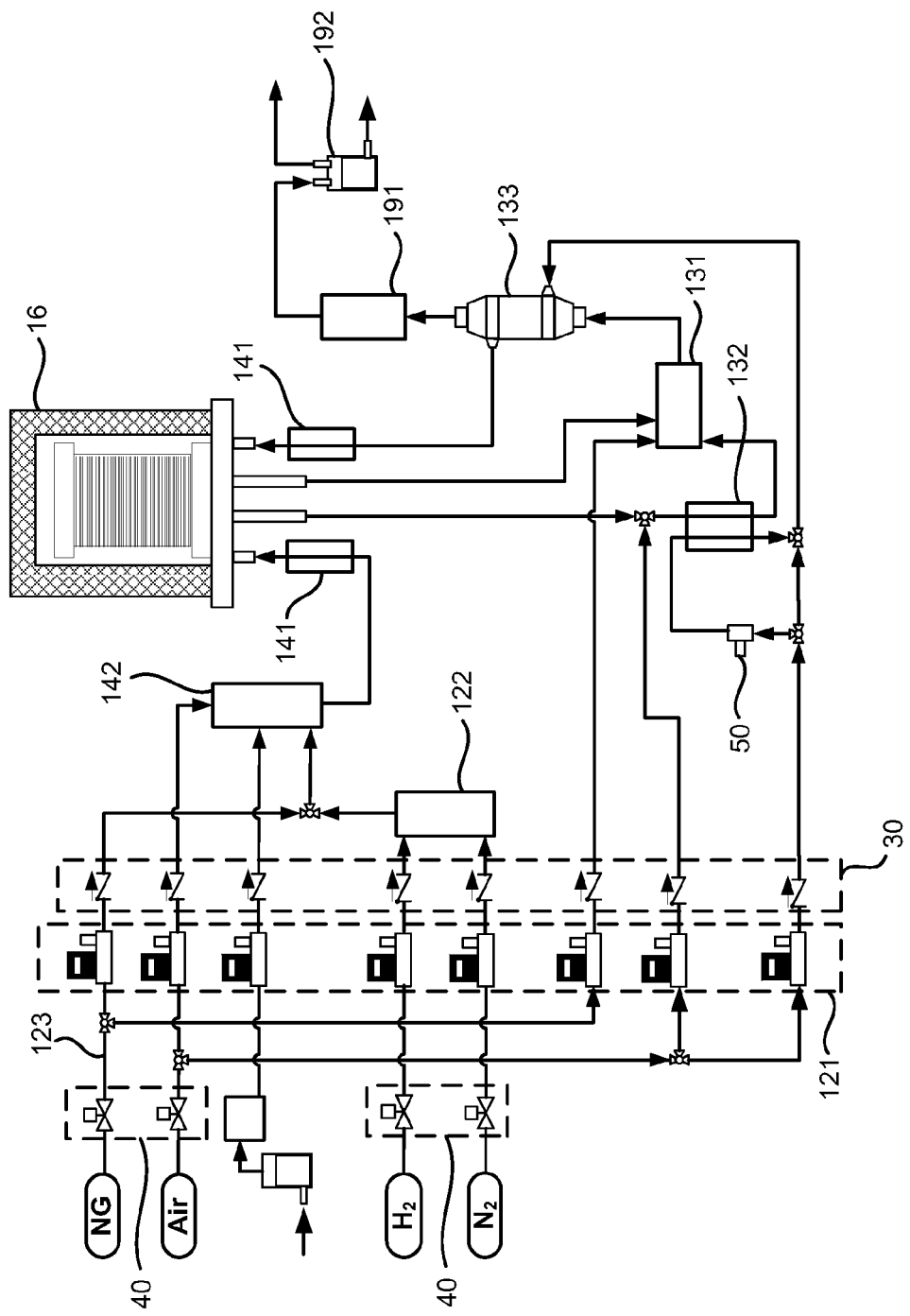
FIG. 2 is a block diagram of a first fluid loop of the system shown in FIG. 1.

There are three layouts for the heat recovery unit 13. In the first layout as shown in FIG. 2, the heat recovery unit 13 includes a burner 131, a front-part heat exchanger 132 and a rear-part heat exchanger 133. The burner 131 may be a porous medium burner or catalyst burner. Hot exhaust is released from the burner 131 into the rear-part heat exchanger 133 for heat recovery.

Figure 3:
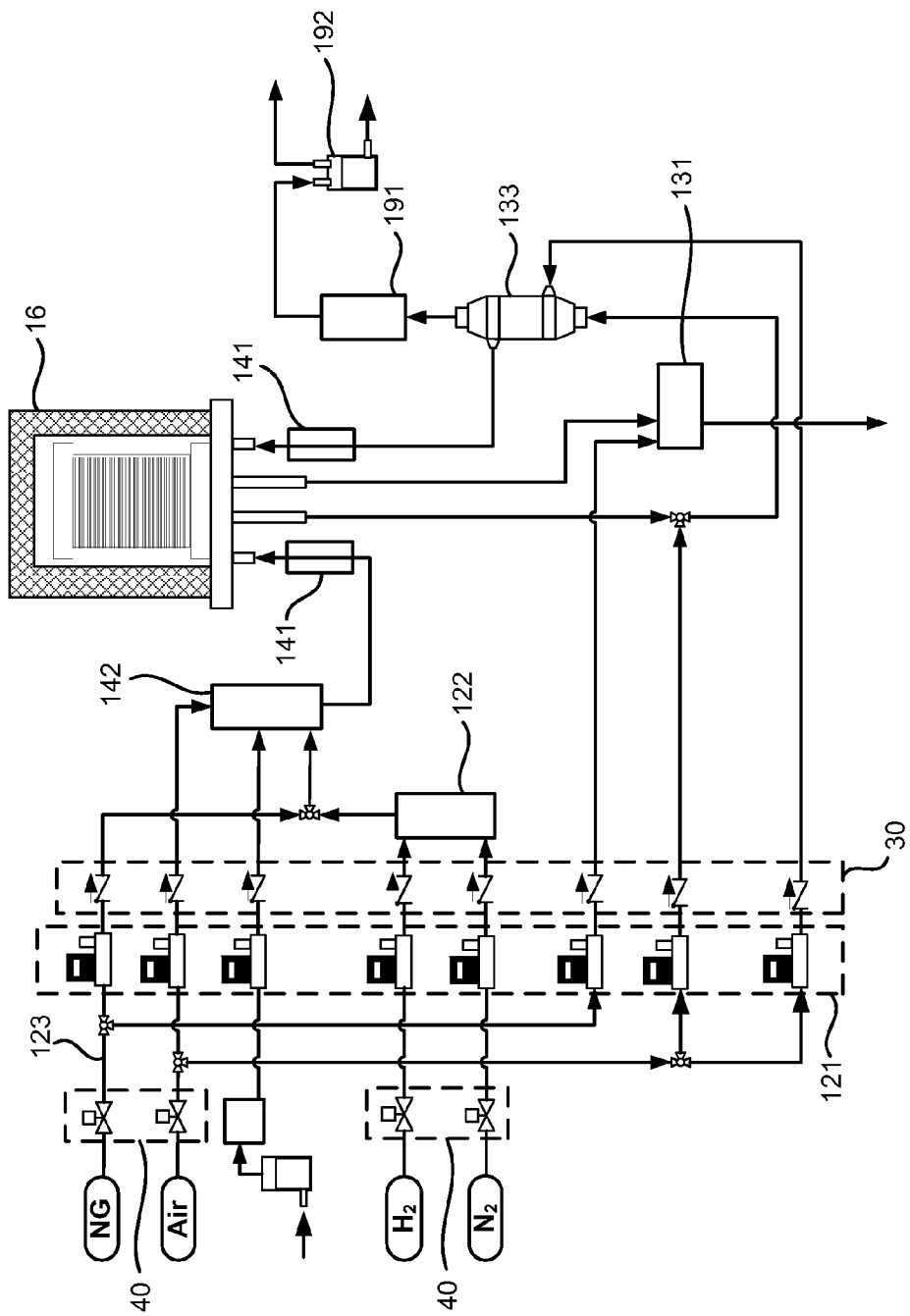
FIG. 3 is a block diagram of a second fluid loop of the system shown in FIG. 1.

In the second layout as shown in FIG. 3, the heat recovery unit 13 includes a burner 131 and a rear-part heat exchanger 133. Hot exhaust is released from the burner 131 into the atmosphere without heat recovery. The burner 131 may be a porous medium burner or catalyst burner.

Figure 4:
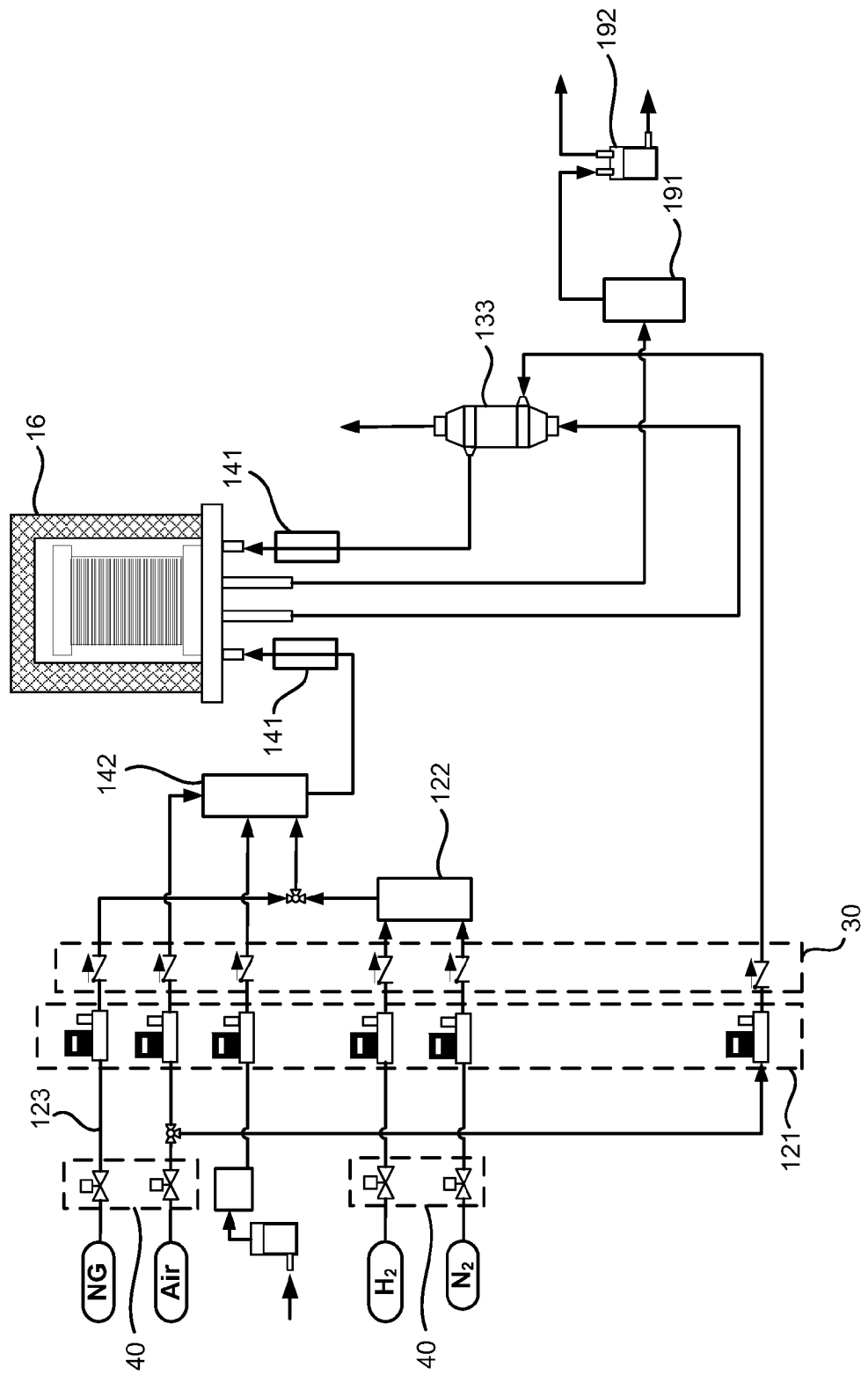
FIG. 4 is a block diagram of a third fluid loop of the system shown in FIG. 1.

In the third layout as shown in FIG. 4, the heat recovery unit 13 only includes a rear-part heat exchanger 133.

The gas-preheating and reforming unit 14 is connected to the temperature control unit 11, the fluid supply unit 12 and the heat recovery unit 13. The gas-preheating and reforming unit 14 includes a heater 141 and a reformer 142. The heater 141 executes a second stage of heating the fluid provided from the fluid supply unit 12. The reformer 142 reforms the fuel provided from the fluid supply unit 12.

The mass flow controllers 121 control flow rates of the fluid required in the SOFC 16, the reformer 142 and the burner 131.

The furnace and compressive load unit 15 is connected to the temperature control unit 11. The furnace and compressive load unit 15 includes a furnace and a compressive load element so that it can heat and exert a compressive load on the SOFC 16. The furnace is operable under the control of the temperature control unit 11.

During the testing, the SOFC 16 is located in the furnace and compressive load unit 15. The SOFC 16 is connected to the heat recovery unit 13 and the gas-preheating and reforming unit 14. The SOFC 16 includes at least on stack for generating electricity via a chemical reaction of the fuel and the oxidizer.

The electrical load and performance measurement unit 17 is connected to the system control unit 10 and the SOFC 16. The electrical load and performance measurement unit 17 includes an electrical load machine and an AC impedance analyzer for measuring the performance of the SOFC 16. The electrical load machine is serially connected to the SOFC 16 to automatically adjust internal resistance to measure the voltage to current performance of the SOFC 16 under various loads. The AC impedance analyzer is connected to the SOFC 16 in parallel for providing AC signals of various frequencies to measure the impedance performance of the SOFC 16.

The gas/pressure analysis unit 18 is connected to the system control unit 10, the fluid supply unit 12, the heat recovery unit 13, the gas-preheating and reforming unit 14 and the SOFC 16. The gas/pressure analysis unit 18 includes a gas analyzer and an absolute/differential pressure sensor. The gas/pressure analysis unit 18 analyzes the composition of gas leaving the reformer 142, the SOFC 16 and the burner 131, evaluates emissions of the units, and monitors the pressure drops across the system. The sequence of sampling the gases leaving the units connected to the gas/pressure analysis unit 18 is under the control of the system control unit 10. The gas analyzer may be a gas chromatograph, an on-line gas analyzer or a flue gas analyzer.

The gas-cooling and vapor-condensing unit 19 is connected to the fluid supply unit 12 and the gas/pressure analysis unit 18. The gas-cooling and vapor-condensing unit 19 includes a gas-cooling and vapor-condensing module 191 and a condensed water filter and storage tank 192. The gas-cooling and vapor-condensing module 191 cools the hot exhaust released from the burner 131 and condenses vapor into water. The condensed water filter and storage tank 192 filters and collects the condensed water for use in the fluid supply unit 12.

The security unit 20 is connected to the system control unit 10. The security unit 20 includes a programmable logic controller ("PLC") operable independent of the system control unit 10, a hazardous gas sensor and an uninterrupted power supply. The security unit 20 monitors the security of the system and triggers a security procedure in the system control unit 10.

The human-machine interface 21 is connected to the system control unit 10. The human-machine interface 21 includes a display and a command output device such as a mouse, a keyboard and a touch panel. The human-machine interface 21 provides numbers, charts and tables of data processed in the industrial computer of the system control unit 10. Moreover, the display and the command output device are used together to give commands to the system control unit 10.

In the first layout, the reformer 142, the burner 131 and the rear-part heat exchanger 133 are connected to check valves 30. Each of the check valves 30 is connected to a related one of the mass flow controllers 121. The mass flow controllers 121 are connected to solenoid valves 40.

In operation, the PLC (or the controller including the microcontroller) of the system control unit 10 is used as a control center to execute an automatic control procedure. At first, the signal acquisition device acquires signals from the units and sensors, and sends the signals to the PLC. Then, the PLC relays the data to the industrial computer for processing and storage of the data. The signals are transferred to the PLC and the industrial computer from the sensors and the units through the signal-and-power line. After the processing of the data in the industrial computer is complete, results are provided in numbers, charts and tables through the human-machine interface 21. At this instant, a user can give commands to control the units through the human-machine interface 21. The flow path of the commands sending is a reverse way mentioned above. The system control unit 10 communicates analog signals with the temperature sensor and the absolute/differential pressure sensor, but communicates digital signals with the other units and sensors. The signals may be communicated according to a digital communication protocol such as RS-323, RS-485, RS-422 and GPIB or an internet communication protocol such as TCP/IP.

To test the performance of the SOFC 16, the fluid supply unit 12 provides a fuel, an oxidizer and water. The fuel includes hydrogen, natural gas and/or a hydrocarbon fuel. The oxidizer is pure oxygen or air. The fuel, the water and the oxidizer are transferred into the heat recovery unit 13 through the piping 123.

In the first phase of heating, the gas is transferred into the front-part heat exchanger 132 from the fluid supply unit 12 through a proportional control valve 50 while hot gas, if any, is transferred into the front-part heat exchanger 132 from the cathode outlet of the SOFC 16. In the front-part heat exchanger 132, the gas receives heat from the hot gas. Hence, the hot gas from the cathode of the SOFC 16 is cooled before it is transferred into the burner 131. On the other hand, gas from the fluid supply unit 12 is preheated.

The preheated gas is sent from the front-part heat exchanger 132 into the rear-part heat exchanger 133 while hot exhaust is released from the burner 131 into the rear-part heat exchanger 133 where the preheated gas receives heat from the hot exhaust. Now, the first phase of preheating is complete. The heat for the first phase of preheating is recovered with the heat recovery unit 13.

If there is any need to humidify the anode inlet gas of the SOFC 16, the fuel can be humidified in the gas humidifier 122 before it is transferred into the SOFC 16.

The second layout of the heat recovery unit 13 shown in FIG. 3 does not include any proportional control valve, nor does the third layout of the heat recovery unit 13 shown in FIG. 4.

After the first phase of heating, the fluid goes into the gas-preheating and reforming unit 14 for a second phase of heating and reforming. The heater 141 preheats the gases before they are transferred into the cathode and anode of the SOFC 16 to compensate the inadequacy of heat in the heat recovery unit 13. The reformer 142 reforms the natural gas, water and air into hydrogen-rich gas. The hydrogen-rich gas is transferred into the SOFC 16 for reaction, thus generating electricity.

After the second phase of heating, the piping 123 sends the fluid into the cathode and anode of the SOFC 16 which is inside the furnace and compressive load unit 15. The furnace and compressive load unit 15 heats the SOFC 16 to 700 to 1000 degrees Celsius to facilitate stable operation of the SOFC 16. A compressive load may be applied on the SOFC 16 via providing a heavy refractory metal block. Instead of the heavy refractory metal block, hydraulic device may be used. A ceramic or metal column may be provided between the hydraulic device and the SOFC 16 to ensure air-tightness and electrical isolation of the SOFC 16.

The performance of the SOFC 16 is measured with the load control and performance measurement unit 17. A conventional electrical load machine and an AC impedance analyzer can be connected to SOFC 16 in series and parallel respectively to measure voltage, current and power curves and impedance performance of the SOFC 16.

In the first layout shown in FIG. 2, as the SOFC 16 performs the electrochemical reaction of the hydrogen-rich gas, and the cathode and anode thereof respectively release residual fuel and air into the burner 131 for combustion, the temperature sensor of the temperature control unit 11 monitors the operative temperatures of the SOFC 16 and the burner 131. As the temperature sensor detect high temperature, the hot gas is transferred from the cathode of the SOFC 16 into the front-part heat exchanger 132 where the cold-end gas is used to cool the hot gas before it is mixed and combusted in the burner 131. Heat generated from the combustion is transferred into the rear-part heat exchanger 133 to heat the fluid provided from the fluid supply unit 12 to significantly reduce the electricity consumed by the preheating and reforming unit 14. The cold-end gas is transferred into the front-end heat exchanger 132 under the control of the system control unit 10.

In the second layout shown in FIG. 3, the cathode and anode of the SOFC 16 respectively release residual fuel and air into the burner 131 for mixing and combustion to reduce pollution. Exhaust is released from the burner 131 into the atmosphere. No heat from burned gas is recovered.

In the third layout shown in FIG. 4, residual fuel is simply released into the atmosphere from the anode outlet of the SOFC 16. The cathode outlet of the SOFC 16 releases hot air into the rear-part heat exchanger 133 for heat recovery.

In the first layout shown in FIG. 2, the exhaust is transferred from the burner 131 into the rear-part heat exchanger 133 before it is sent into the gas/pressure analysis unit 18. Not only the heat recovery unit 13 is connected to the gas/pressure analysis unit 18, but also the fluid supply unit 12, the preheating and reforming unit 14 and the SOFC 16 are connected to the gas/pressure analysis unit 18 through gas-sampling pipes. The sampling is executed in order under the control of the system control unit 10. Via the analysis of the gas samples, the properties of the gases generated from the reformer 142, the SOFC 16 and the burner 131 are obtained. Based on data related to the properties of the gases, the pollution generated by and operative efficiencies of the units are evaluated. The absolute/differential pressure sensor of the gas/pressure analysis unit 18 monitors the pressure in selected segment of the system. Via measuring a value of pressure at a single point or the differential pressure between two points along the flow path, a pressure drop is learned. The system control unit 10 uses the pressure drop to determine whether there is clogging or deposition of carbon in the units and whether to take actions to remove such clogging or carbon deposition.

After the gas/pressure analysis unit 18, the exhaust is transferred into the gas-cooling and vapor-condensing unit 19. The gas-cooling and vapor-condensing module 191 of the gas-cooling and vapor-condensing unit 19 cools the exhaust at a rear end of the system so that vapor in the exhaust condenses into water for recovery. The condensed water filter and storage tank 192 of the gas-cooling and vapor-condensing unit 19 collects and filter the water so that the water can be transferred into the fluid supply unit fore reuse. Thus, the demand for pure water in the system is significantly reduced.

Because the fuel for the SOFC 16 is explosive, the PLC (or the controller including the microcontroller) of the security unit 20 is operated independently of the system control unit 10. When there is leak or an event that could endanger operative personnel, the PLC of the security system stops the supply of all gases except nitrogen. The uninterrupted power supply of the security unit 20 connected to the system control unit 10 and the fluid supply unit 12 provides a buffer period long enough for executing a fuel cell-protecting procedure and an urgent shut-down procedure after the interruption of the mains power. For example, the supply of the fuel is interrupted, and the nitrogen is used to purge the anode of the SOFC 16. The hazardous gas sensor of the security unit 20 determines whether there is leakage of the fuel or hazardous gas such as carbon monoxide. The hazardous gas sensor is located in the security unit 20 for local monitoring or a laboratory for overall monitoring. The hazardous gas sensor is connected to the security unit 20 and the system control unit 10. When the concentration of such hazardous gas reaches a predetermined value, the system control unit 10 executes a system-level urgent shut-down procedure. For example, all valves for supplying the fuel are closed.

Figure 5:
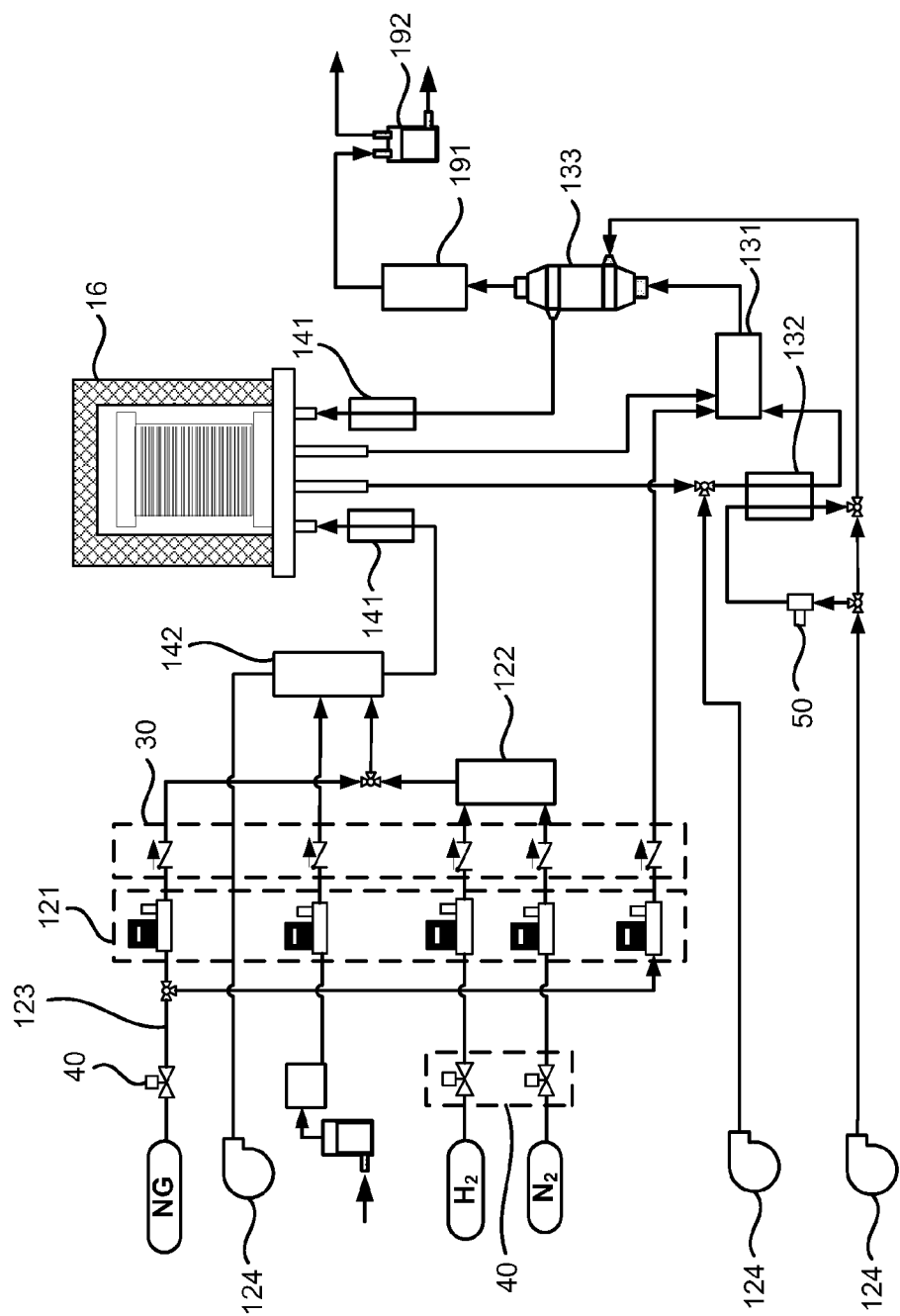
FIG. 5 is a block diagram of a system for testing fuel cells according to the second embodiment of the present invention.

Referring to FIG. 5, there is shown an environmentally friendly, energy-economic system according to a second embodiment of the present invention. The second embodiment is like the first embodiment except that the fluid supply 12 includes blowers 124. The mass flow controllers 121 and the blowers 124 together control flow rates of the fluid required in the SOFC 16, the reformer 142 and the burner 131. With the use of the blowers 124, there is no need for air compressors.

As described above, with the system, high-temperature fuel cells can be tested manually or automatically. The system provides the operative conditions such as temperatures and the flow rates of the fluid required during the testing of the fuel cells. The units ensure the stability and security of the testing that lasts for long. With the heat recovery, the consumption of energy and the production of pollutants are significantly reduced. Hence, the system is energy-economic and environmentally friendly. Accordingly, the cost in the development and testing of the fuel cells are reduced.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. An environmentally friendly, fuel-economic system for testing a fuel cell, the system comprising:
   a system control unit comprising a controller, a signal acquisition device, an industrial computer and a signal-and-power line;
   a temperature control unit being connected to the system control unit, and comprising a temperature sensor and a temperature controller;
   a fluid supply unit for providing fluid comprising a fuel, an oxidizer and water, the fluid supply unit being connected to the system control unit, and comprising mass flow controllers, a gas humidifier and a piping;
   a heat recovery unit being connected to the system control unit, the fluid supply unit and the fuel cell, and comprising a rear-part heat exchanger for recovering heat of hot gas released from the fuel cell;
   a gas-preheating and reforming unit being connected to the fuel cell, and comprising:
      a heater for executing a second phase of heating the fluid provided from the fluid supply unit; and
      a reformer for reforming the fuel;
   a furnace and compressive load unit being connected to the temperature control unit, and comprising:
      a furnace for heating the fuel cell under the control of the temperature controller; and
      a compressive load element for exerting a compressive load on the fuel cell;
   an electrical load and performance measurement unit being connected to the system control unit and the fuel cell, and comprising an electrical load machine and an AC impedance analyzer for measuring performance of the fuel cell;
   a gas/pressure analysis unit being connected to the system control unit, the fluid supply unit, the heat recovery unit, the preheating and reforming unit and the fuel cell, and comprising:
      a gas analyzer for analyzing gases released from the reformer, the burner and the fuel cell to evaluate performance of the units, wherein sampling of the gases is executed under the control of the system control unit; and
      an absolute/differential pressure sensor for monitoring pressure in a middle segment of the system;
   a gas-cooling and vapor-condensing unit being connected to the fluid supply unit and the gas/pressure analysis unit, and comprising:
      a gas-cooling and vapor-condensing module for cooling the hot gas in a rear segment of the system; and
      a condensed water filter and storage tank for filtering and collecting the water for use in the fluid supply unit; and
   a security unit for monitoring security in the system and triggering a security procedure in the system control unit, the security unit being connected to the system control unit, and comprising a programmable logic controller operable independent of the system control unit, a hazardous gas sensor and an uninterruptible power supply;

a human-machine interface being connected to the system control unit, and comprising:
- a display for showing numbers, charts and tables of data processed in the industrial computer; and
- a command output device operable for giving commands to the system control unit;

wherein the controller of the system control unit is used as a control center for the temperature control unit, the fluid supply unit, the heat recovery unit, the load control and performance measurement unit, the gas/pressure analysis unit, the security unit and the human-machine interface.

2. The system according to claim 1, wherein the mass flow controllers are used to control the fluid required in the fuel cell, the reformer and the burner.

3. The system according to claim 1, wherein the fluid supply unit is used to supply at least one of a group consisting of hydrogen, natural gas and a hydrocarbon fuel.

4. The system according to claim 1, wherein the fluid supply unit is used to supply at least one of a group consisting of oxygen and air.

5. The system according to claim 1, wherein the heat recovery unit comprises a burner for receiving fluid from the fluid supply unit and hot gas from the anode of the fuel cell, mixing the fluid with the hot gas, and burning the mixture.

6. The system according to claim 1, wherein the heat recovery unit comprises:
- a burner for receiving fluid from the fluid supply unit and hot gas from the anode of the fuel cell, mixing the fluid with the hot gas, and burning the mixture; and
- a front-part heat exchanger for receiving fluid from the fluid supply unit and hot gas from the cathode of the fuel cell so that the fluid is heated before it is transferred into the rear-part heat exchanger and that the hot gas is cooled before it is transferred into the burner.

7. The system according to claim 1, wherein the fluid supply unit comprises blowers.

8. The system according to claim 1, wherein the temperature sensor and the absolute/differential pressure sensor communicate analog signals with the system control unit.

9. The system according to claim 1, wherein the system control unit communicates digital signals with the other units according one of a group consisting of RS-232, RS-485, RS-422, GPIB and TCP/IP.

10. The system according to claim 1, wherein the temperature sensor is used to control power of the gas-preheating and reforming unit and the furnace and compressive load unit.

11. The system according to claim 1, wherein the compressive load element is selected from one of a group consisting of a refractory metal block of a certain weight located on the furnace and a hydraulic device for exerting a compressive load on the furnace through a refractory column.

12. The system according to claim 1, wherein the furnace is used to increase the temperature of the fuel cell to 700 to 1000 degrees Celsius.

13. The system according to claim 1, wherein the electrical load machine is connected to the fuel cell in series to automatically adjust internal resistance to measure performance of the fuel cell under various loads.

14. The system according to claim 1, wherein the AC impedance analyzer is connected to the fuel cell in parallel for providing AC signals of various frequencies for detecting impedance of the fuel cell.

15. The system according to claim 1, wherein the burner is selected from a group consisting of a porous medium burner and a catalyst burner.

16. The system according to claim 1, wherein the front-part heat exchanger is operable under the control of the system control unit.

17. The system according to claim 1, wherein the gas analyzer is selected from a group consisting of a gas chromatograph, an on-line gas analyzer and a flue gas analyzer.

18. The system according to claim 1, wherein the controller of the system control unit is used to execute an automatic control procedure.

19. The system according to claim 1, wherein the human-machine interface is selected from a group consisting of a mouse, a keyboard and a touch panel.

20. The system according to claim 1, wherein the reformer, the burner and the rear-part heat exchanger comprise check valves each corresponding to one of the mass flow controllers, and the mass flow controllers are connected to solenoid valves.

* * * * *